(12) United States Patent
Di Costanzo et al.

(10) Patent No.: US 8,984,845 B2
(45) Date of Patent: *Mar. 24, 2015

(54) PLASTIC FILMS

(71) Applicant: IRPLAST S.p.A., Empoli, Florence (IT)

(72) Inventors: Carmelo Di Costanzo, Chieti (IT); Giuseppe Tiberini, Chieti (IT); Giulia Antidormi, Milan (IT); Giacomo Soluri, Florence (IT)

(73) Assignee: IRPLAST S.p.A., Empoli (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/689,593

(22) Filed: Nov. 29, 2012

(65) Prior Publication Data

US 2013/0139479 A1    Jun. 6, 2013

(30) Foreign Application Priority Data

Dec. 2, 2011   (IT) .............................. MI2011A2204
Jun. 29, 2012  (IT) .............................. MI2012A1155

(51) Int. Cl.
*C09J 7/02*       (2006.01)
*B65B 7/00*       (2006.01)
*B32B 27/32*      (2006.01)
*C08J 5/18*       (2006.01)

(52) U.S. Cl.
CPC ............. B32B 27/32 (2013.01); *B32B 2250/03* (2013.01); *B32B 2250/242* (2013.01); *B32B 2405/00* (2013.01); B65B 7/00 (2013.01); C08J 5/18 (2013.01); *C08J 2323/02* (2013.01); C09J 7/0275 (2013.01); *C09J 2201/622* (2013.01)
USPC .......................... 53/476; 428/220; 264/210.1

(58) Field of Classification Search
USPC .......................... 53/476; 428/220; 264/210.1
See application file for complete search history.

(56) References Cited

U.S. PATENT DOCUMENTS

| | | |
|---|---|---|
| 3,937,762 A | 2/1976 | Nahmias et al. |
| 4,595,738 A | 6/1986 | Hufnagel et al. |
| 4,853,602 A | 8/1989 | Hommes et al. |
| 4,921,749 A | 5/1990 | Bossaert et al. |
| 5,051,225 A | 9/1991 | Hommes et al. |
| 5,118,566 A | 6/1992 | Wilhelm et al. |
| 2002/0032295 A1 | 3/2002 | Peiffer et al. |
| 2003/0148119 A1 | 8/2003 | Su et al. |
| 2009/0053513 A1 | 2/2009 | Enzinger et al. |
| 2011/0281096 A1 | 11/2011 | Enzinger et al. |

FOREIGN PATENT DOCUMENTS

| | | |
|---|---|---|
| CA | 2 047 469 C | 1/1992 |
| EP | 0 079 520 A2 | 5/1983 |

OTHER PUBLICATIONS

Dr. -Ing.Jurgen Breil, "New High-Grade S-BOPP and S-BOPET Film Types Produced with the Linear Motor Stretching Technology", Specialty Plastics Films '99 Global Film Resins, Markets, Applications 15th Annual World Congress, Dec. 13, 1999, pp. 1-22.

Dr. Jurgen Breil, "Lisim Linear Motor Simultaneous Stretching Technology", Presentation at CMM International Conference, Apr. 16, 1997, pp. 1-14.

*Primary Examiner* — Robert D. Harlan
(74) *Attorney, Agent, or Firm* — Arent Fox LLP

(57) ABSTRACT

Use of olefin-based plastic films for obtaining for obtaining roll tapes for closing containers, the films having a thickness in the range from 10 to 22 µm, flexural rigidity (N·mm) in the range $0.5 \times 10^{-2}$-$4.5 \times 10^{-2}$ neglecting a constant $1/[12 \times (1-v^2)]$ being v the Poisson modulus, an elongation at break in MD, determined according to ASTM D 882, lower than 130%, a dimensional stability, determined according to the OPMA TC 4 standard at 130° C. for 5 minutes in air in MD in the range from 0 to −10% and in TD from −4 to +4%.

22 Claims, No Drawings

PLASTIC FILMS

The present invention relates to the use of polyole-fin-based films from roll for preparing adhesive tapes for closing containers, the films having a thickness in the range from 10 to 22 μm, preferably from 14 to 20 μm, combined with a flexural rigidity (N·mm) in the range $0.5 \times 10^{-2}$-$4.5 \times 10^{-2}$ neglecting a constant $1/[12 \times (1-v^2)]$ wherein v is the Poisson modulus related to the used polymer, v being of the order of 0.2-0.4 for polyolefins, and a low number of scraps during the tape application, lower than 0.1% for an industrial line closing 8 containers/minute with 33×22×31 cm sizes, and a number of scraps during the transformation step as below defined lower than 8%, preferably lower than 5%, still more preferably lower than 3% net of trimmed edges.

More in particular the films of the present invention are preferably multilayer films with at least two layers, preferably three or more, generally 5 or 7 layers, etc., wherein the core layer is a propylene homopolymer with an amount of extractables in n-hexane (50° C. for two hours) lower than 10% by weight, preferably lower than 5%, still more preferably lower than 2%, as determined according to the FDA 177 1520 standard, combined with a dimensional stability in machine direction (MD), determined according to the OPMA TC 4 standard (Oriented Polypropylene Manufacturer Association) at 130° C. for 5 minutes in air ranging from 0 and −10%, preferably from −4 and −8.5%, and in transverse direction (TD) from −4 to +4%, preferably from 0 to +2.5%.

The films of the present invention are preferably obtainable by extrusion of granules of polyolefinic polymers until obtaining reels having very high film lengths also, of the order of 20,000 m.

The use of plastic films for obtaining roll adhesive tapes to be applied onto containers, for example for closing cartons, is known in the art. The thickness of the plastic films at present used on the market is, respetively, 25, 28, 28, 32, 40, 50 μm. One surface of the films is coated with a pressure sensitive adhesive (hot melt technology, solvent and water base).

Patent application US 2002/0032295 relates to a propylene homopolymer film having improved barrier properties to steam and oxygen and improved mechanical properties. The film is biaxially oriented, has an isotactic index of at least 95% and does not contain hydrocarbon resins. The elastic modulus in longitudinal direction (MD) is higher than 2,500 N/mm² and in transversal direction (TD) is higher than 4,000 N/mm². In this patent application no indication is given that the film can be used to form adhesive tapes.

U.S. Pat. No. 5,118,566 discloses a biaxially oriented polypropylene film, used as adhesive tape, endowed with high mechanical resistance properties, the film comprising (% by weight) from 69 to 94.99% of a polyolefin, 5-35% of an hydrocarbon resin having softening point in the range 70° C.-170° C. and from 0.01% to 1% of a nucleating agent.

Patent application EP 79,520 discloses a polypropylene plastic film comprising a natural or synthetic resin with a softening point from 70 to 170° C. in an amount from 1 to 30% by weight with respect to the total weight of the film, an elastic modulus in MD in the range 4,000-6,000 N/mm², the film after extrusion and cooling is subjected to three stretching steps two of which are in MD. The film is used for packaging and as insulating material for condensers and as an adhesive tape.

U.S. Pat. No. 4,595,738 discloses isotactic polypropylene films oriented by simultaneous biaxial stretching, wherein the stretching ratio is at least 1:45, with low residual tensile stress in MD, a specific puncture resistance and certain elongation factors. The film is particularly suitable to store optical or acoustic information, as adhesive tape for packaging or as layer for laminates.

U.S. Pat. No. 3,937,762 describes a polymeric composition and thermoplastic films obtained therefrom having improved physical properties, comprising a polyolefin containing a lower amount of a resin formed of a random multipolymer of a mixture comprising pentadiene 1,3 and at least one other monomer having one ethylenic unsaturation. The resin amount ranges from 5 to 40% by weight. These compositions are used in the preparation of oriented polypropylene films and of ethylene-propylene copolymers showing a lower sealing temperature and a wider range of sealing temperatures and an increased modulus with respect to the films not containing the random multipolymer additive. No indications are given on specific uses.

U.S. Pat. No. 4,921,749 describes a film having an improved seal strength and improved barrier properties, comprising a core formed of 70%-97% by weight of a polyolefin and from 3 to 30% by weight of a low molecular weight resin different from polyolefins, for example an hydrogenated resin. A skin film is applied on at least one surface of the core, the ratio by weight between the skin film and the core ranges from 1% to 20%. The skin layer comprises a random copolymer formed of 80% to 99% by weight of propylene and from 1 to 20% of ethylene. The resin has a molecular weight lower than 5,000 and a softening point from 60° C. to 180° C. These films are used in heat-seal packaging in particular in place of cellophane.

Patent application US 2003/0148,119 relates to a heat-sealable coextruded oriented polyolefin multilayer film having at least one propylene polymer with high crystallinity and with an isotactic index higher than 95% by weight mixed with an hydrocarbon resin up to 10% by weight. The film can be subjected to corona, flame, plasma treatment on one surface. On the other surface there is a heat-sealing layer. The film shows a very good resistance to distortion caused by food oils and, having good barrier properties to said oils, is used in the snack food packaging industry.

Patent application CA 2,047,469 describes a heat-sealable film comprising a base polypropylene layer and an hydrocarbon resin having a softening point of at least 140° C., and at least one top layer comprising (a) an ethylene/propylene copolymer having an ethylene content not higher than about 10% by weight, (b) a propylene/1-butene copolymer, (c) a propylene/ethylene/alpha-olefin terpolymer or a blend of two or more of the above polymers. At least one of these layers contains an anti-blocking agent or a lubricant. The film shows better barrier properties to steam and oxygen, good slip properties and low shrinkage values.

There is the continuous need from the industries using adhesive tapes to reduce the amount of plastic material used for closing containers, also for environmental problems. As a matter of fact efforts are undertaken to use a lower amount of plastic materials to reduce the energy consumption requested for their manufacture. In this way the environmental sustainability is remarkably improved, as a lower amount of $CO_2$ is produced and therefore also a lower green house effect (GWP) is obtained.

Furthermore when the adhesive tapes have ended their life cycle they must be recycled and/or disposed of. The market trend is to reduce the amount of commercial packages, and therefore also of adhesive tapes, to be recycled and/or eliminated. It is well known in fact that disposal involves high costs.

It should be considered that the transformation industries require to have available films from rolls (extrusion daughter rolls) having a length of about 20,000 m from which to obtain printed, adhesive coated and cut rolls, having a maximum outer diameter of 600 mm for closing containers.

The Applicant has unexpectedly and surprisingly found the solution to the above technical problem, that is the substantial reduction of the plastic film scraps and the use of a plastic film having a combination of features as reported below for closing containers on packaging lines with low scraps and substantially with the same efficiency of the standard films at present used.

It is an object of the present invention the use of polyolefin-based plastic films to obtain rolls of adhesive tapes for closing containers, the films having a thickness comprised between 10 and 22 µm, flexural rigidity (N·mm) in the range $0.5 \times 10^{-2}$-$4.5 \times 10^{-2}$ neglecting a constant $1/[12 \times (1-v^2)]$v being the Poisson modulus having a value of about 0.2-0.4 for polyolefins, elongation at break (%) in MD, determined according to ASTM D 882 lower than 130%, dimensional stability, determined according to the OPMA TC 4 standard at 130° C. for 5 minutes in air, in MD in the range from 0 to −10% and in TD from −4 to +4%. Preferably the films have elastic modulus (N/mm$^2$) in TD lower than 3,500 and in MD (N/mm$^2$) from 2,600 to 3,800, preferably from 3,000 to 3,600.

The tapes have an ageing resistance of at least one month, preferably of at least 3 months, more preferably of 6 months, still more preferably 12 months. The ageing resistance is determined by an accelerated ageing test in oven at 40° C. for 5 days in air, which is equivalent to the ageing at room temperature for one year.

As said, the scraps during adhesive tape application to containers are lower than 0.1% for an industrial line closing, per minute, 8 containers having 33×22×31 cm sizes. Scraps during the transformation step for making the tapes are lower than 8%, preferably lower than 5%, preferably lower than 3%, net of trimmed edges. The latter are not considered in calculating scraps as the percentage of trimmed edges depends on the width of the film that is used.

More in detail, the latter scraps refer to the manufacture step of the roll (transformation step) wherein the plastic film rolls obtained by extrusion of granules, called transformation mother rolls (neutral film) are submitted to film printing, adhesive coating of one side of the film and cutting for obtaining the adhesive tape rolls.

Preferably the thickness of the invention films is in the range 14-19 µm.

Preferably the flexural rigidity (N·mm) is in the range $0.7 \times 10^{-2}$-$3.5 \times 10^{-2}$, more preferably $0.8 \times 10^{-2}$-$3.0 \times 10^{-2}$, still more preferably $0.9 \times 10^{-2}$-$2.8 \times 10^{-2}$.

Preferably the elongation at break in MD is lower than 120%, more preferably lower than 110%.
more preferably lower than 110%.

Preferably the elongation at break in MD ≥80%, more preferably ≥90%.

Preferably the elastic modulus in TD is ≥2,500, more preferably ≥2,700 N/mm$^2$.

Preferably the tensile strength at break ranges from 228 to 170 N/mm$^2$.

Preferably the dimensional stability of the film of the invention in MD is in the range from −4 to −8.5% and in TD from 0 to +2.5%.

The polyolefin-based plastic films are preferably based on propylene homopolymers having an extractable amount in n-hexane (50° C. for two hours) lower than 10% by weight, as determined according to the FDA 177 1520 standard and preferably a melt flow index (MFI) in the range from 1.0-10 g/10 min (230° C. 10 min-load 2.16 Kg ASTM D1238).

Preferably the propylene homopolymers have an amount of extractables, determined with the above method, lower than 5%, more preferably lower than 2%.

The films of the present invention are preferably in multilayer films, comprising:
a core: propylene homopolymers,
skin layers, equal to or different from each other, based on propylene homopolymers and/or olefinic copolymers.
The homopolymers used in the core and in outer layers are preferably different from each other.

The olefinic copolymers of the skin layers are selected from copolymers of propylene with at least another at least one ethylenic unsaturation containing comonomer, preferably selected from ethylene and alpha-olefins having a number of carbon atoms ranging from 4 to 12, the total comonomer amount ranging from 0.5 to 25% by weight, preferably from 1 to 7% by weight on the total polymer monomers.

The comonomers containing at least one ethylenic unsaturation are for example ethylene, butene, hexene, octene, decene, dodecene. Preferably the comonomer is ethylene. Generally the copolymers contain (% by moles) ethylene from 0 to 33%, preferably 3-15%, more preferably 5-10%. The alpha-olefinic monomer (% by moles) is comprised in the range 0-10%, preferably 0.5-6%.

Further comonomers (% by moles) that can be present in the copolymers are cyclopentadiene and terpenes, in an amount by moles up to 10%, preferably 0-5%.

The propylene copolymers have an amount of extractables lower than 10% by weight, preferably lower than 3%.

The melt flow index of the propylene copolymers preferably ranges from 1 to 30 g/10 min (230° C. 10 min load 2.16 Kg ASTM D1238).

Preferably in the present invention polyolefin-based plastic films, preferably propylene polymers, are used to obtain adhesive tapes in rolls, for use in closing containers having:
thickness in the range 14-19 µm, flexural rigidity in the range $0.9 \times 10^{-2}$-$3.5 \times 10^{-2}$, elongation at break in MD determined according to ASTM D 882 lower than 120%, elastic modulus (N/mm$^2$) in TD lower than 3,500, in MD in the range 3,000-3,600, the dimensional stability of the multilayer film in MD in the range from −4 to −8.5%, and in TD from 0 to +2.5%,
a number of scraps during the tape application to the containers lower than or equal to 0.1%,
a number of scraps during the transformation step lower than 3%, neat of trimmed edges.

More preferably the polyolefin-based plastic films, preferably propylene polymers, have:
thickness in the range 14-19 µm, flexural rigidity in the range $0.9 \times 10^{-2}$-$3.5 \times 10^{-2}$, elongation at break in MD determined according to ASTM D 882 lower than 120% and ≥90%, elastic modulus (N/mm$^2$) in TD lower than 3,500 and ≥2,700, in MD in the range 3,000-3,600, the tensile strength at break from 228 to 170 N/mm$^2$, the dimensional stability of the multi-layer film in MD in the range from −4 to −8.5%, and in TD from 0 to +2.5%,
a number of scraps during the tape application to the containers lower than or equal to 0.1%, a number of scraps during the transformation step lower than 3%, neat of trimmed edges.

The film is preferably multilayer and comprises a core: propylene homopolymers as defined above,
skin layers, equal to or different from each others: propylene homopolymers or propylene copolymers having the above features.

The Applicant has unexpectedly and surprisingly found that it is possible to decrease the film thickness and obtain adhesive tapes for closing containers having a very low thickness with respect to the commercial films at present used, even though the tapes of the invention have a rigidity remarkably lower than the commercial ones. This is quite unexpected and unforeseeable, as one would have expected that tapes with so low thickness caused wrinkling, creasing and folding, which are defects not accepted by the market and compromise the tape closure of the containers. This brings to scrap values unacceptable for the industries in this field, and to inefficiencies in the tape application on machines, for example machine downtimes and jammings.

The skilled in the field would have also expected that the polyolefin-based films, having so low thickness, were not stable in time. In fact the skilled would have expected that the migration in the film of the low molecular weight components, for example of oligomers in the film polymeric compositions, or of additives when present, had a negative influence on the anchorage of inks and/or adhesives to the surface-treated side of the film. In this case the tape would be of no commercial value as scraps would be very high. In fact the skilled in the field would have expected a number of scraps in the application as a minimum of the order of 30%.

Even more surprisingly and unexpectedly, the Applicant has found that also in the transformation step, that is during the printing, adhesive application step and following film winding into rolls, no film wrinkling, creasing or folding is noted. The skilled would have expected that during roll winding of printed and adhesive coated films of so low a thickness, wrinkles, creases and folds were instead formed, with a negative impact on the scrap overall amount.

The Applicant has unexpectedly and surprisingly found that the films of the invention allow to the application and transformation industries to maintain the scraps during the tape application at quite low values, comparable to those given by the films of the market which have a thickness, as said above, ranging from 25 to 50 μm.

The film, preferably multilayer, of the invention is oriented at least in one direction, preferably it is bioriented.

The skin layer can comprise optional components selected from slip agents, anti-blocking agents; the core can comprise optional components selected from antistatic agents, dyestuffs, hydrocarbon resins, olefinic copolymers, etc. For example for preparing transparent films, preferably no dyestuff is used, while for films printed in the outer (skin) layer dyestuffs with a high covering power (higher optical density and lower film transmittance) are used, in particular masterbatches based on $TiO_2$.

As slip agents the following ones can be mentioned: higher aliphatic acid amides, higher aliphatic acid esters, waxes, salts of fatty acids with metals and polydimethyl siloxanes. The amount is the one generally used in films.

As antiblocking agents, inorganic compounds, as silicon dioxide, calcium carbonate and the like can be mentioned. The amount is generally comprised between about 0.1 and about 0.5% by weight with respect to the layer weight.

As antistatic agents, aliphatic tertiary amines with saturated linear chains containing an aliphatic $C_{10}$-$C_{20}$ chain and substituted with w-hydroxy-($C_1$-$C_4$) alkyl groups, can be mentioned. Among tertiary amines, N,N-bis(2-hydroxyethyl) alkylamines containing $C_{10}$-$C_{20}$, preferably $C_{12}$-$C_{18}$ alkyl groups, can be mentioned. The amount of antistatic agent is generally comprised between about 0.05% and about 0.2% with respect to the layer weight.

When a multilayer film is used, in the core preferably hydrogenated hydrocarbon resins, having preferably a softening point determined according to ASTM E28 ranging from 130° C. to about 180° C., can be added in amounts ranging from about 2% to 40% by weight, preferably lower than 20%, still more preferably from 4 to 12%, the percentages being based on the total weight of the olefinic polymer plus the hydrocarbon resin. Preferably the hydrocarbon resin is a low molecular weight synthetic resin having a softening point between about 130° C. and 160° C.; the number average molecular weight preferably ranges from 200 to 1,000. Hydrocarbon resins of this type preferably comprise one or more of the following monomers: styrene, methylstyrene, vinyltoluene, indene, pentadiene, cyclopentadiene and the like. Hydrogenated resins of cyclopentadiene are preferred. The hydrocarbon resin, if desired, can be added also in the skin layers.

In the multilayer film of the present invention, preferably in the core, propylene-based olefinic copolymers as indicated above can be added, or copolymers of ethylene with one or more linear or branched alpha olefins from 3 to carbon atoms, optionally in the presence of other comonomers, containing more than one double bond, in addition to the alpha-olefinic double bond, conjugated or not, from 4 to 20 carbon atoms, or cyclic olefins wherein the ring has 5 or 6 carbon atoms, preferably cycloalkenes, such as vinylcyclohexene; aromatic olefins such as cyclopentadiene; vinylaromatic such as styrene. The alpha-olefinic and dienic monomers can be selected from those indicated above, propylene included. The total amount of comonomers (% by moles) ranges from 5 to 50%, preferably from 10 to 25%, the number average molecular weight being preferably in the range 300-25,000.

The amount of olefinic copolymers (% by weight), added in the film or in the core, ranges from 0 to 20% with respect to the amount of propylene homopolymers of the film or of the core, preferably from 0 to 10%, still more preferably 0-3%.

In the case of the multilayer film, instead of adding in the core said copolymers and/or hydrocarbon resins, intermediate layers can be used, made of copolymers and/or hydrocarbon resins, provided that the outer layers of the film of the present invention remain as above defined. The layer to be printed is preferably treated with known methods to modify the surface tension, to improve the anchorage of the printing inks and/or adhesives. Preferably corona, flame or plasma treatment is used.

The films of the invention can be obtained by known technologies for manufacturing films, preferably polyolefin-based multilayer films, in particular based on propylene homopolymers or propylene-based copolymers. A particularly preferred process is the simultaneous stretching technology Lisim®. This technology is described in several patents, as for example U.S. Pat. No. 4,853,602, U.S. Pat. No. 5,051,225.

The process for the manufacture of the multilayer films comprises the following steps:
  coextrusion of the multilayer sheet of the film, having a thickness preferably comprised between about 0.5 mm and about 4 mm;
  sheet cooling on the surface of a cooled chill roll dipped in a water bath, preferably at a temperature in the range 5-35° C.;
  sheet heating, preferably by infrared rays, wherein the surface of the IR panels is at a temperature comprised between about 100° C. and about 500° C.;
  sheet stretching and orientation by a simultaneous process in MD and TD direction, preferably by fixing the sheet edges, having an higher thickness than the sheet, with a series of pliers/clamps independently driven by linear synchronous induction motors, wherein the set of pliers/clamps runs on divergent stretching rails;
  the linear synchronous induction motors are fed with alternate currents, with phases and frequencies modulated so that the pliers/clamps follow a pre-programmed linear speed profile for obtaining the required stretching ratios in MD;

wherein the MD stretching ratios are a function of the profile of the longitudinal linear speed and the TD stretching ratios are regulated by the distance (divergence) between the stretching rails;

for the stretching steps a stretching frame comprising one or more sections, located inside an oven at temperatures comprised between about 150° and 190° C., is used;

the MD longitudinal stretching ratios being comprised from about 4:1 to about 9:1 and the TD transversal stretching ratios from about 3:1 to about 8:1.

heat setting in TD, preferably by converging the stretching rails in one or more sections of the stretching frame at temperatures of about 130° C.-140° C., and heat setting in MD, obtained by decreasing the pliers linear speed.

With a good approximation, the MD stretching ratio can be considered equal to the ratio between the film speed at the outlet of the stretching frame and the film speed at the inlet of the film into the stretching frame. Depending on the set up of the stretching equipment, this ratio is equivalent to the ratio between the frequency of the alternate current fed to the linear electric motors at the outlet of the stretching frame and the frequency of the alternate current fed to the linear motors at the inlet of the stretching frame.

The stretching ratio in TD can be considered with a good approximation equivalent to the ratio between the film width at the outlet of the stretching frame and the film width at the inlet of the stretching frame.

Positive values of the dimensional stability in TD of the films of the present invention resulted extremely useful during the printing step as they allow to remarkably reduce scraps during the transformation step.

It is a quite unexpected and surprising that by the preferred simultaneous stretching technology Lisim® it is possible to obtain a positive dimensional stability value (dilatation). As a matter of fact, with the conventional sequential stretching technology a negative value of dimensional stability is obtained. In the latter case, modifications in the printing step have to be introduced to take into account the film shrinkage in TD. Therefore the Lisim® simultaneous stretching technology allows to remarkably simplify the printing step, as no intervention is requested on the printing machine.

The films of the present invention are endowed of excellent mechanical properties as shown by their tensile properties (tensile strength at break, elastic modulus, elongation at break) determined according to ASTM D 882. The films of the invention have also good optical properties as shown by the gloss and haze values.

The films of the present invention after surface treatment (corona, flame, plasma) are printed by conventional techniques and coated on one side, preferably full coated with adhesive, preferably on the inner side, and used for closing containers.

The adhesives that can be used are available on the market. The following ones can be mentioned: water acrylic adhesives, in the form of aqueous emulsions based on $C_3$-$C_{20}$, preferably $C_3$-$C_5$ esters of (meth)acrylic acid, for example buthylmethacrylate; "hot melt" adhesives, generally formed of thermoplastic rubbers and hydrocarbon resins; natural rubber dissolved in organic solvents, for example hexane or toluene; aqueous emulsions of natural rubber latexes.

A further object of the present invention are polyolefin-based plastic films as defined above. The plastic films of the present invention have an elastic modulus in TD lower than 3,500 N/mm², in MD in the range from 2,600 to 3,800 N/mm², preferably from 3,000 to 3,600 N/mm².

The films of the present invention are generally obtainable by extrusion of granules of polyolefinic polymers and the obtained films, preferably after having been oriented and heat set, are wound in rolls called extrusion mother rolls (neutral, i.e. untreated film). By cutting, extrusion daughter rolls are obtained therefrom. In the transformation step the extrusion daughter reels are used, that in this step are called transformation mother rolls and are subjected to printing, adhesive coating and cutting processes to get the adhesive tape rolls of printed films for the end use.

A further object of the present invention are adhesive tapes obtainable from plastic films.

The Applicant remarks that the films of the present invention allow to obtain remarkable advantages from an industrial point of view, as by using adhesive tape rolls of the present invention, having the same diameter of the rolls of commercial adhesive tapes, as said the latter having generally having film thickness from 25 to 50 µm, it is possible to obtain a lower impact on the production, transportation and storage costs, as the roll film length is greater. This latter feature, the roll diameter being the same as that of commercial films, brings to fewer roll substitutions and therefore fewer machine downtimes, giving a higher yield on the tape application lines.

The following examples are given for illustrative purposes and are not limitative of the present invention.

EXAMPLES

Characterization

Melt Flow Index (MFI)

The melt flow index was determined at 230° C. for 10 min with a load of 2.16 Kg according to ISO 1133.

Extractables Amounts of Propylene Polymers

The extractables are determined by extracting a sample of the polymer with n-hexane at 50° C. for two hours according to FDA 177 1520 Standard.

Film Dimensional Stability

The film dimensional stability is determined according to OPMA TC 4 standard by heating a sample having 20 cm×1 cm sizes at 130° C. for 5 minutes in the air.

If the sample shrinks, the number of the dimensional stability is preceded by –, if the sample dilates, by +.

Young Modulus (Elastic Modulus)

The modulus of Young, or elastic modulus (N/mm²) has been determined according to the ASTM D 882 standard both in MD direction and in TD direction.

Elongation at Break and Tensile Strength at Break

The elongation at break and tensile strength at break (N/mm²) of the film are determined by ASTM D 882.

Flexural Rigidity

The flexural rigidity, or rigidity (N·mm), is given by the following formula:

$$R=[E \cdot d^3]/12(1-v^2)$$

wherein R is the rigidity, E the Young modulus and d is the thickness in mm. In the calculation of flexural rigidity calculation $v^2$ is neglected as it is very low compared to 1.

Haze

The Haze values are determined according to ASTM D 1003.

Gloss

The Gloss values are determined according to ASTM D 2457 standard.

Scraps standard.

Scraps

In the transformation step scraps are calculated with reference to the weight of the starting film roll. In the application step scraps are calculated with reference to the number of containers (cartons) discarded with respect to those obtained.

FORMULATION EXAMPLES

Process for the Preparation of the Film of the Invention

The film has been obtained by coextruding through a flat head three polymeric layers, respectively, the core and the skin layers.

The core has been extruded at extruder temperatures in the range 235° C.-255° C., the skin layers at extruder temperatures comprised between 260° C.-275° C. The three layers have been coextruded in a flat head at the temperature of 245° C. The so obtained sheet has been cooled to a temperature of 25° C. on a chill roll, partly dipped in a water bath having a temperature of 28° C. The chilled sheet passed through an infrared heating battery wherein the surface temperature of the heating panels was comprised between 200° C. and 320° C. Then the sheet entered a simultaneous stretching oven Lisim® wherein:

the temperature set of the preheating zone was in the range 165° C.-170° C.;

the temperature set of the stretching zone was in the range 159° C.-163° C.;

the temperature set of the annealing zone was in the range 164° C.-170° C.;

the longitudinal and transversal stretching ratios at the outlet of the stretching frame were respectively of 7 and 6.5. The so obtained film was flame treated on a surface obtaining a surface tension value ≥44 dyne/cm at t=0.

Example 1

By the process above reported a multilayer film according to the invention was prepared, having thickness 19 μm and the following composition:

core layer 100% by weight of PP homopolymer, MFI 2, (HP522H LyondellBasell® polymers) having 17 thickness μm, skin layer 1 (skin 1 flame surface treated, to be printed): 99% by weight of a PP homopolymer having MFI 2.0 (HP422H LyondelBasell® polymers), +1% by weight of a polypropylene silica masterbatch (AB 6001PP Schulmann®-anti-block agent). Skin 1 thickness is 1 μm.

skin layer 2 (skin 2, not surface treated): 93% by weight of PP homopolymer, +6% by weight of slip agent ABVT34SC (Schulmann®) masterbatch based on silicone particles having a 2 μm diameter, +1% by weight of a silica masterbatch with polypropylene carrier as in skin 1. Skin 2 thickness is 1 μm.

The characterization data are reported in Table 1.

The flexural rigidity of the film was $2.20 \times 10^{-2}$ N·mm.

The Young modulus of the film in TD direction was 2780 N/mm$^2$.

Example 2

Example 1 was repeated but using in the core 90% by weight of propylene homopolymer of Example 1+10% by weight of masterbatch of amorphous hydrocarbon resins with polypropylene carrier Constab MA00929PP (see for example the technical card KafritGroup of July 2010).

The thickness of the core and of the skin layers was as in the film of example 1.

The characterization data are reported in Table 1.

The flexural rigidity of the film was $2.61 \times 10^{-2}$ N·mm.

The Young modulus of the film in TD direction was 3152 N/mm$^2$.

Example 3

Example 2 was repeated but using in the core 89% by weight of propylene homopolymer of example 1, +1% by weight of antistatic agent ASPA2446 (Schulmann®) masterbatch with propylene homopolymer carrier, instead of 90% by weight of propylene homopolymer.

In skin 2 a polypropylene ADSTIFHA612M (Lyondell-Basell®) having MFI=6 has been used. The core thickness was 14 μm, the thickness of each skin layer was 2.5 μm.

The characterization data are reported in Table 1.

The flexural rigidity of the film was $2.47 \times 10^{-2}$ N·mm.

The Young modulus of the film in TD direction was 3374 N/mm$^2$.

Example 4

Example 3 was repeated but skin 1 was 100% by weight of propylene-ethylene copolymer with MFI=5.5.

Skin 2 was 94% by weight of propylene homopolymer +6% by weight of masterbatch comprising the slip agent in polypropylene carrier as used in skin 2 of example 1.

The core thickness was of 17 μm, the thickness of each skin layer was 1 μm.

The characterization data are reported in Table 1.

The flexural rigidity of the film was $2.17 \times 10^{-2}$ N·mm.

The Young modulus of the film in TD direction was 2904 N/mm$^2$.

Example 5

Example 4 was repeated but with skin 2 having the same composition as skin 2 of the film of example 3. The thickness of each of the three layers was as in the film of example 4.

The characterization data are reported in Table 1.

The flexural rigidity of the film was $2.24 \times 10^{-2}$ N·mm. The Young modulus of the film in TD direction was 2928 N/mm$^2$.

Example 6

Example 1 was repeated but the core was the same as in example 3 i.e., 94% by weight of PP homopolymer, +5% by weight of the masterbatch of amorphous hydrocarbon resins with polypropylene carrier Constab® MA00929PP, +1% anatistatic masterbatch. The thickness of each of the three layers was as in the film of example 4.

The characterization data are reported in Table 1.

The flexural rigidity of the film was $2.24 \times 10^{-2}$ N·mm.

The Young modulus of the film in TD direction was 2878 N/mm².

Example 7

Example 6 was repeated but in the core 94% polypropylene was formed of 84% by weight of propylene homopolymer used in example 6+10% of reclaim (regranulated) propylene polymers. The thickness of each of the three layers was as in the film of example 4.

The characterization data are reported in Table 1.
The flexural rigidity of the film was $2.24\times10^{-2}$ N·mm.
The Young modulus of the film in TD direction was 3100 N/mm².

Example 8

Example 7 was repeated but substituting in the core 94% of PP homopolymer with 69% of PP homopolymer +25% of master-batch of titanium dioxide (white 70) with polypropylene carrier. The masterbatches of amorphous resin and of anti-static were in the same amounts as in ex. 7. The thickness of each of the three layers was as in the film of example 4. The characterization data are reported in Table 1.

The flexural rigidity of the film was $2.26\times10^{-2}$ N·mm.
The Young modulus of the film in TD direction was 3192 N/mm².

Example 9

According to the process reported above a multilayer film was prepared, having thickness 15 μm and the following composition:
- core: 89% by weight PP homopolymer MFI 2, (HP522H LyondellBasell® polymers), +10% by weight of masterbach of amorphous hydrocarbon resins in propylene homopolymer carrier Constab MA00929PP, +1% by weight of antistatic agent ASPA2446 (Schulmann®) masterbatch with polypropylene carrier; the core thickness was 13 μm,
- skin 1: 99% by weight of a propylene homopolymer having MFI 2.0 (HP422H LyondelBasell® polymers), +1% by weight of a silica masterbatch in propylene homopolymer carrier (AB 6001PP Schulmann® anti-block agent); the layer thickness was 1 μm,
- skin 2: 93% by weight of polypropylene homopolymer HP522H LyondellBasell® polymers), +6% by weight of slip agent ABVT34SC (Schulmann®) masterbatch based on silicone particles having a 2 μm diameter, +1% by weight of a silica masterbatch in polypropylene AB 6001PP; the layer thickness was of 1 μm.

The characterization data are reported in Table 2.
The flexural rigidity of the film was $1.22\times10^{-2}$ N·mm.
The Young modulus of the film in TD direction was 3107 N/mm².

Example 10

Example 9 was repeated but the core thickness was 11 μm and the thickness of each skin layer was 2 μm.

The composition of skin 2 was 93% by weight of polypropylene homopolymer ADSTIFHA612M (LyonellBasell®) having MFI 6, +6% by weight of slip agent ABVT34SC (Schulmann®) masterbatch based on silicone particles having a 2 μm diameter, +1% by weight of a silica masterbatch in polypropylene AB 6001PP.

The characterization data are reported in Table 2.

The flexural rigidity of the film was $1.25\times10^{-2}$ N·mm.
The Young modulus of the film in TD direction was 3163 N/mm².

Example 11

Example 9 was repeated but the layer composition was the following:
- core: 84% by weight of propylene homopolymer of example 9, +10% by weight of reclaim (regranulated) propylene homopolymer, +5% by weight of masterbach of amorphous hydrocarbon resins Constab MA00929PP, +1% by weight of antistatic agent ASPA2446,
- skin 1: 100% by weight of propylene-ethylene copolymer having MFI-5.5,
- skin 2: 93% by weight of PP homopolymer, +6% by weight of slip agent ABVT34SC (Schulmann®) masterbatch based on silicone particles having a 2 μm diameter, +1% by weight of a silica masterbatch with polypropylene carrier (AB 6001PP Schulmann® anti-block agent).

The thickness of the layers was as in example 9.
The characterization data are reported in Table 2.
The flexural rigidity of the film was $1.0\times10^{-2}$ N·mm.
The Young modulus of the film in TD direction was 3050 N/mm².

APPLICATION EXAMPLES

Example 11A

The extrusion daughter rolls of the film of example 11, having a width of 620 mm, film length 20,000 m and diameter 780 mm (film thickness 15 μm, film density 0.91 g/cm³), were printed with one color on the internal side of the film, by using flexographic techniques and water-based inks. The printing speed was of 180 m/min. The whole reel was printed.

About 100 linear meters equal to 0.850 Kg (0.5% by weight), net of trimmed edges, were scraped for checking color tone and ink anchorage.

The printing step lasted about 110 min. The roll at the end of the printing process did not show folding, creasing and wrinkling.

Then the internal side of the printed roll film was full coated with commercial hot melt adhesive, by using an industrial coating machine at a line speed of 450 m/min.

The applied adhesive amount was of 16 g/m²±2.

This step lasted about 45 min. The scraps amounted to about 400 m, equal to about 3.5 kg (about 2.0% by weight). The obtained roll was free from folds, creases and wrinkles.

The roll was then cut on an industrial cutting machine to form transformation daughter rolls.

Overall, 12 transformation daughter rolls having width 50 mm width and film length 66 m (these sizes are those requested for manual application by a dispenser) were obtained for each processing cycle. The cutting process is a discontinuous process wherein the film of the extrusion daughter rolls is subjected to acceleration and deceleration steps with maximum line speed peaks of 180 m/min. The cutting step lasted about 120 min. After about 300 working cycles, 3,600 adhesive tape rolls 50 mm (width)×66 m (diameter 350 mm) were obtained.

The adhesive tape rolls were inserted in a manual dispenser and used for closing packages having 33×22×31 cm sizes by dispenser.

The adhesive tape applied onto the packages did not show folds and/or creases and/or wrinkles. In the application step there were no scraps.

This application example shows that the film of the invention, although having thickness 15 μm, can be used with very good results and very reduced scraps to obtain adhesive tape rolls, and that the rolls can be used under the same processing conditions of the commercial adhesive tapes rolls having a greater film thickness, in the range from 25 to 50 μm.

The use in adhesive tape application of films having such a reduced thickness brings advantages, as shown by the higher yields in the processing steps, higher film length with the same roll diameter and reduced room for roll storage with the same film length, lower transportation costs, reduced environmental impact due to fewer emissions of $CO_2$ in the processing steps, and reduced amounts of material to be disposed of.

Example 11B

Example 11A was repeated but in the cutting step the rolls were cut to a film length of 1550 m for an automatic in line application for closing cartons.

The rolls were then inserted into an automatic tape applicator machine SIAT XL35-P®, equipped with an application head SIAT Ku®. The adhesive tape applied on cartons had the same sizes as those used in example 11A.

The adhesive tape was applied by the automatic tape applicator machine on the upper part of the cartons. The applied adhesive tape length was 48 cm.

The line was uninterruptedly operated for 8 hours, at a line speed of about 8 cartons/minute. The tape still available on the roll made it possible to continue the application for up to a total of 13.5 hours. With one roll of adhesive tape, having film thickness 15 μm and length 1,550 m, 3,229 cartons were closed. No jamming or formation of creases and/or folds and/or wrinkles occurred during the application.

Example 12

Comparative

Commercial rolls of adhesive tape in polypropylene coated with pressure sensitive adhesive, having film thickness 28 μm, width 50 mm and length 990 m (diameter 350 mm), were used. The film was printed on the inner (internal) side of the film. The adhesive was of the hot melt type and applied on the whole inner surface of the tape, with a weight equal to 16 $g/m^2 \pm 2$.

The adhesive tape rolls were used for closing cartons having the same sizes as those used in example 11A, by using the same automatic tape applicator machine equipped with a tape applicator head as in example 11A. Line speed and the tape length applied on the cartons were as in example 11B.

With one roll 2,062 cartons were closed and it was possible to operate the line uninterruptedly for 8 hours, after which the roll had to be changed to continue the application.

From the data of it can be drawn, the roll diameter being the same, that with the roll having film thickness 15 μm of example 11A according to the invention 3,229 cartons were closed. This means a yield increase of more than 35% with respect to the comparative example.

TABLE 1

| Ex. | Thickness μm | Core | Skin 1 (subjected to surface treatments) | Skin 2 | Ultimate tensile stress | Elongation in MD % | Elastic modulus in MD $N/mm^2$ | Dimensional-stability in % MD | Dimensional-stability in % TD |
|---|---|---|---|---|---|---|---|---|---|
| 1 | 19 | PP Homopolymer | 99% PP homopolymer + 1% silicamasterbatch | 93% PP homopolymer + 1% silica masterbatch + 6% slip agentmasterbatch | 226 | 102 | 3200 | −7.3 | +1.4 |
| 2 | 19 | 90% PP homopolymer + 10% masterbatch of amorphous resins | 99% PP homopolymer + 1% silicamasterbatch | 93% PP homopolymer + 1% silica masterbatch + 6% slip agent masterbatch | 209 | 97 | 3800 | −9 | +0.9 |
| 3 | 19 | 89% PP homopolymer + 10% masterbatch of amorphious resins + 1% antistatic masterbatch | 99% PP homopolymer + 1% silicamasterbatch | 93% PP homopolymer + 1% silica masterbatch + 6% slip agent masterbatch | 211 | 109 | 3596 | −8.1 | +0.7 |
| 4 | 19 | 89% PP homopolymer + 10% masterbatch of amorphous resins + 1% antistatic masterbatch | CopolymerP/E | 94% P/E copolymer + 6% slip agent masterbatch | 177 | 93 | 3170 | −7.3 | +1.4 |
| 5 | 19 | 89% PP homopolymer + 10% masterbatch of amorphous resins + 1% antistatic masterbatch | P/ECopolymer | 93% PP homopolymer + 1% silica masterbatch + 6% slip agent masterbatch | 213 | 121 | 3273 | −7.3 | +1.1 |
| 6 | 19 | 94% PP homopolymer + 5% masterbatch of amorphous resins + 1% antistatic masterbatch | 99% PP homopolymer + 1% silica masterbatch | 93% PP homopolymer + 1% silica masterbatch + 6% slip agent masterbatch | 206 | 111 | 3267 | −7.4 | +1.2 |
| 7 | 19 | 94% PP homopolymer + 5% masterbatch of amorphous resins + 1% antistatic masterbatch | 99% PP homopolymer + 1% silicamasterbatch | 93% PP homopolymer + 1% silica masterbatch + 6% slip agent masterbatch | 217 | 117 | 3100 | −7.3 | +1.0 |

TABLE 1-continued

| Ex. | Thickness μm | Core | Skin 1 (subjected to surface treatments) | Skin 2 | Ultimate tensile stress | Elongation in MD % | Elastic modulus in MD N/mm² | Dimensional-stability in % MD | Dimensional-stability in % TD |
|---|---|---|---|---|---|---|---|---|---|
| 8 | 19 | 69% PP homopolymer + 5% masterbatch of amorphous resins + 1% antistatic masterbatch + 25% masterbatch TiO₂ | 99% PP homopolymer + 1% silicamasterbatch | 93% PP homopolymer + 1% silica masterbatch + 6% slip agent masterbatch | 178 | 101 | 3297 | −6.0 | +1.0 |

TABLE 2

| Ex. | Thickness μm | Core | Skin 1 (subjected to surface treatments) | Skin 2 | Ultimate tensile stress in MD N/mm² | Elongation in MD % | Elastic modulus in MD N/mm² | Dimensional-stability in % MD | Dimensional-stability in % TD |
|---|---|---|---|---|---|---|---|---|---|
| 9 | 15 | 89% PP homopolymer + 10% masterbatch of amorphous resins + 1% antistatic masterbatch | 99% PP homopolymer + 1% silicamasterbatch | 93% PP homopolymer + 1% silica masterbatch + 6% slip agent masterbatch | 221 | 108 | 3612 | −8.7 | +1.5 |
| 10 | 15 | 89% PP homopolymer + 10% masterbatch of amorphous resins + 1% antistatic masterbatch | 99% PP homopolymer + 1% silicamasterbatch | 93% PP homopolymeer + 1% silica masterbatch + 6% slip agent masterbatch | 215 | 105 | 3719 | −8.2 | +1.,3 |
| 11 | 15 | 94% PP homopolymer + 5% masterbatch of amorphous resins + 1% antistatic masterbatch | P/Ecopolymer | 93% PP homopolymer + 1% silica masterbatch + 6% slip agent masterbatch | 212 | 104 | 3050 | −8.1 | +1.,2 |

The invention claimed is:

1. A process for obtaining roll tapes for closing containers wherein polyolefin-based plastic films having a thickness in the range from 10 to 22 μm; a flexural rigidity (N·mm) in the range of $0.5 \times 10^{-2}$-$4.5 \times 10^{-2}$ neglecting a constant $1/[12 \times (1-v^2)]$, v being the Poisson modulus; an elongation at break in MD, determined according to ASTM D 882, lower than 130%; and a dimensional stability, determined according to the OPMA TC 4 standard at 130° C. for 5 minutes in air in MD in the range from 0 to −10% and in TD from −4 to +4%, are used.

2. The process according to claim 1, wherein the plastic films have an elastic modulus in TD lower than 3,500 N/mm² and in MD from 2,600 to 3,800 N/mm².

3. The process according to claim 2, wherein the polyolefin-based plastic films have an elastic modulus in TD lower than 3,500 N/mm² and in MD in the range from 3,000 to 3,600 N/mm².

4. The process according to claim 1, wherein the tapes have an aging resistance of at least one month.

5. The process according to claim 1, wherein scraps during the tape application to containers are lower than 0.1% by weight for an industrial line closing 8 containers/minute having size 33×22×31 cm and scraps during the transformation step for manufacturing the tapes lower than 8% net of trimmed edges.

6. The process according to claim 1, wherein the film thickness is in the range of 14-19 μm.

7. The process according to claim 1, wherein the flexural rigidity is in the range of $0.7 \times 10^{-2}$-$3.5 \times 10^{-2}$ N·mm.

8. The process according to claim 1, wherein the flexural rigidity is in the range of $0.8 \times 10^{-2}$-$3.0 \times 10^{-2}$ N·mm.

9. The process according to claim 1, wherein the flexural rigidity is in the range of $0.9 \times 10^{-2}$-$2.8 \times 10^{-2}$ N·mm.

10. The process according to claim 1, wherein the elongation at break is lower than 120%.

11. The process according to claim 1, wherein the dimensional stability in MD is in the range from −4 to −8.5% and in TD in the range from 0 to +2.5%.

12. The process according to claim 1, wherein the plastic films are based on propylene homopolymers having an extractable amount in n-hexane lower than 10% by weight as determined according to the FDA 177 1520 standard.

13. The process according to claim 1, wherein the plastic films are multilayers comprising:
   core: propylene homopolymers, and
   skin layers, equal to or different from each other, based on propylene homopolymers, olefinic copolymers or a mixture of propylene homopolymers and olefinic copolymers.

14. The process according to claim 13, wherein the olefinic copolymers of the skin layers are selected from copolymers of propylene with at least another ethylenic unsaturation containing comonomer, preferably selected from ethylene and alpha-olefins having a number of carbon atoms ranging from 4 to 12, the total comonomer amount being comprised between 0.5 and 25% by weight on the total monomers.

15. The process according to claim 13, wherein the propylene copolymers have a concentration of extractables lower than 10%.

16. The process according to claim 1, wherein the polyolefin-based plastic films have a thickness ranging from 14 to 19 μm, flexural rigidity from $0.9 \times 10^{-2}$ to $3.5 \times 10^{-2}$ N·mm, elongation at break in MD lower than 120%, elastic modulus in TD lower than 3,500 N/mm$^2$ and in MD from 3,000 to 3,600 N/mm$^2$, dimensional stability in MD in the range from −4 and −8.5%, and in TD from 0 to +2.5%.

17. The process according to claim 13, wherein the skin layers comprise optional components selected from slip agents and anti-blocking agents; the core layer comprises optional components selected from antistatic agents, dye-stuffs, hydrogenated hydrocarbon resins in amounts from about 2% to 40% by weight on the total weight of the olefinic polymer plus the core hydrocarbon resin, propylene copolymers or ethylene copolymers in amounts from 0 to 20% with respect to the propylene homopolymer amount.

18. A process for preparing plastic films, comprising the following steps:
coextrusion of the film sheet;
sheet cooling on the surface of cooled chill roll dipped in a water bath;
sheet heating;
sheet stretching and orientation by a simultaneous orientation process in MD and TD direction by taking the sheet edges, having an higher thickness than the sheet, with a series of pliers/clamps independently driven by linear synchronous induction motors, wherein the pliers/clamps set runs on divergent stretching rails;
For the stretching step a stretching frame comprising one or more sections located inside an oven at temperatures comprised between about 150° and 190° C., is used;
the MD longitudinal stretching ratios being comprised from about 4:1 to about 9:1 and the TD transversal stretching ratios from about 3:1 to about 8:1;
heat setting in TD, preferably through a convergence of the stretching rails and heat setting in MD by decreasing the linear pliers speed;
wherein the plastic films are polyolefin-based plastic film having a thickness in the range from 10 to 22 μm; a flexural rigidity (N·mm) in the range of 0.5×10$^{-2}$-4.5×10$^{-2}$ neglecting a constant 1/[12×(1−v$^2$)], v being the Poisson modulus; an elongation at break in MD, determined according to ASTM D 882, lower than 130%; and a dimensional stability, determined according to the OPMA TC 4 standard at 130° C. for 5 minutes in air in MD in the range from 0 to −10% and in TD from −4 to +4%.

19. A polyolefin-based plastic film having a thickness in the range from 10 to 22 μm; a flexural rigidity (N·mm) in the range of 0.5×10$^{-2}$-4.5×10$^{-2}$ neglecting a constant 1/[12×(1−v$^2$)], v being the Poisson modulus; an elongation at break in MD, determined according to ASTM D 882, lower than 130%; and a dimensional stability, determined according to the OPMA TC 4 standard at 130° C. for 5 minutes in air in MD in the range from 0 to −10% and in TD from −4 to +4%.

20. Films according to claim 19 wherein the elastic modulus in TD is lower than 3,500 N/mm$^2$ and in MD is in the range from 2,600 to 3,800 N/mm$^2$, preferably from 3,000 to 3.600 N/mm$^2$.

21. Polyolefin-based plastic films obtainable by the process of claim 18.

22. Adhesive tapes obtainable from the plastic films of claim 20.

* * * * *